United States Patent [19]
Barratt et al.

[11] Patent Number: 5,592,490
[45] Date of Patent: Jan. 7, 1997

[54] SPECTRALLY EFFICIENT HIGH CAPACITY WIRELESS COMMUNICATION SYSTEMS

[75] Inventors: Craig H. Barratt, Redwood City, Calif.; David M. Parish, Amherst, N.Y.; Richard H. Roy, III, Mountain View, Calif.

[73] Assignee: ArrayComm, Inc., San Jose, Calif.

[21] Appl. No.: 375,848

[22] Filed: Jan. 20, 1995

Related U.S. Application Data

[63] Continuation-in-part of Ser. No. 806,695, Dec. 12, 1991, Pat. No. 5,515,378, and Ser. No. 234,747, Apr. 28, 1994.

[51] Int. Cl.$^6$ ............................................. H04Q 7/00
[52] U.S. Cl. ........................... 370/310; 370/329; 364/574
[58] Field of Search .................................. 370/95.1, 95.3, 370/119; 342/368, 442, 378, 383, 384; 364/572, 574, 578, 581; 375/200, 205; 455/33.3, 63

[56] References Cited

U.S. PATENT DOCUMENTS

| | | | |
|---|---|---|---|
| 4,965,732 | 10/1990 | Roy, III et al. | 364/460 |
| 5,103,459 | 4/1992 | Gilhousen et al. | 375/205 |
| 5,255,210 | 10/1993 | Gardner et al. | 364/574 |
| 5,260,968 | 11/1993 | Gardner et al. | 375/200 |
| 5,262,789 | 11/1993 | Silverstein | 342/368 |
| 5,299,148 | 3/1994 | Gardner et al. | 364/574 |
| 5,471,647 | 11/1995 | Gerlach et al. | 455/63 |

OTHER PUBLICATIONS

Friedlander et al. "Direction Finding for Wideband Signals Using an Interpolated Array", 1991, IEEE Publication, pp. 583–587.
Friedlander "Direction Finding Using an Interpolated Array", 1990 IEEE Publication, pp. 2951–2954.

*Primary Examiner*—Benedict V. Safourek
*Assistant Examiner*—Chau T. Nguyen
*Attorney, Agent, or Firm*—Townsend and Townsend and Crew LLP; Henry K. Woodward

[57] ABSTRACT

A wireless system comprising a network of base stations for receiving uplink signals transmitted from a plurality of remote terminals and for transmitting downlink signals to the plurality of remote terminals using a plurality of conventional channels including a plurality of antenna elements at each base station for receiving uplink signals, a plurality of antenna elements at each base station for transmitting downlink signals, a signal processor at each base station connected to the receiving antenna elements and to the transmitting antenna elements for determining spatial signatures and multiplexing and demultiplexing functions for each remote terminal antenna for each conventional channel, and a multiple base station network controller for optimizing network performance, whereby communication between the base stations and a plurality of remote terminals in each of the conventional channels can occur simultaneously.

35 Claims, 9 Drawing Sheets

SPECTRALLY EFFICIENT HIGH CAPACITY WIRELESS COMMUNICATION SYSTEMS

CROSS REFERENCE TO RELATED APPLICATIONS

This application is a continuation-in-part of copending patent application Ser. No. 07/806,695 U.S. Pat. No. 5,515,378, filed 12 Dec. 1991 for Spatial Division Multiple Access Wireless Communication Systems, and Ser. No. 08/234,747 filed 28 Apr. 1994 for Method and Apparatus for Calibrating Antenna Arrays, pending.

BACKGROUND OF THE INVENTION

This invention relates to wireless communication systems and, more particularly, to using antenna arrays and signal processing to dramatically increase the capacity and performance of wireless communication systems.

Wireless communication systems can be used to complement and in some instances replace conventional wired communication systems in areas where conventional wireline systems are unavailable, unreliable, or excessively expensive. Examples of such areas are: rural areas with a small number of widespread users, underdeveloped areas with little or no current infrastructure, reliability sensitive applications in areas where wired infrastructure is unreliable, and political environments where monopolistic wired service providers maintain artificially high prices. Even in metropolitan areas and highly developed countries, wireless communication systems may be used for low-cost ubiquitous communication, new flexible data services, and emergency communication systems. In general, wireless communication systems may be used for voice communications just like conventional telephone systems, and for data communications in a radio-based wide area or local area network as well.

Wireless users access wireless communication systems using remote terminals such as cellular telephones and data modems equipped with radio transceivers. Such systems (and in particular the remote terminals) have protocols for initiating calls, receiving calls, and general transfer of information. The information transfer can be performed in realtime such as is the case for circuit-switched voice conversations and faxes, or in a store-and-forward manner such as is often the case for electronic mail, paging and other similar message transfer systems.

Wireless communication systems are generally allocated a portion of the radio frequency spectrum for their operation. The allocated portion of the spectrum is divided up into communication channels. These channels may be distinguished by frequency, by time, by code, or by some combination of the above. Each of these communication channels will be referred to herein as conventional channels. Depending on the available frequency allocations, the wireless system might have from one to several hundred communication channels. To provide full-duplex communication links, typically some of the communication channels are used for communication from base stations to users' remote terminals (the downlink), and others are used for communication from users' remote terminals to base stations (the uplink).

Wireless communication systems generally have one or more radio base stations, each of which provide coverage to a geographic area known as a cell and often serve as a point-of-presence (PoP) providing connection to a wide area network such as a Public Switched Telephone Network (PSTN). Often a predetermined subset of the available communication channels is assigned to each radio base station in an attempt to minimize the amount of interference experienced by users of the system. Within its cell, a radio base station can communicate simultaneously with many remote terminals by using different conventional communication channels for each remote terminal.

As aforementioned, base stations can act as PoPs, providing connection to one or more wired communication systems. Such systems include local data networks, wide area data networks, and PSTNs. Thus, remote users are provided access to local and/or wide area data services and the local public telephone system. Base stations can also be used to provide local connectivity without direct access to a wired network such as in local area emergency and mobile battlefield communication systems. Base stations can provide connectivity of various kinds as well. In the aforementioned examples, point-to-point communications where roughly equal amounts of information flow in both directions between two users were assumed. In other applications such as interactive television, information is broadcast to all users simultaneously, and responses from many of the remote units arc to be processed at the base stations.

However, conventional wireless communication systems are comparatively spectrally inefficient. In conventional wireless communication systems, only one remote terminal can use any one conventional channel within a cell at any one time. If more than one remote terminal in a cell attempts to use the same channel at the same time, the downlink and uplink signals associated with the remote terminals interfere with each other. Since conventional receiver technology can not eliminate the interference in these combined uplink and downlink signals, remote terminals are unable to communicate effectively with the base station when interference is present. Thus, the total capacity of the system is limited by the number of conventional channels the base station has available, and in the overall system, by the way in which these channels are re-used among multiple cells. Consequently, conventional wireless systems arc unable to provide capacity anywhere near that of wired communication systems.

SUMMARY OF THE INVENTION

Accordingly, an object of the present invention is to use antenna arrays and signal processing to separate combinations of received (uplink) signals. Another object of the present invention is to transmit spatially multiplexed downlink signals. The result is a dramatic increase in spectral efficiency, capacity, signal quality, and coverage of wireless communication systems. Capacity is increased by allowing multiple users to simultaneously share the same conventional communication channel within a cell without interfering with one another, and further by allowing more frequent reuse of the same conventional channel within geographic area covering many cells. Signal quality and coverage area are improved through intelligent processing of signals received from and transmitted by multiple antenna elements. Moreover, a further object of the present invention is to provide capacity gains by dynamically allocating conventional channels among base stations and remote terminals.

Briefly, the invention comprises antenna arrays and signal processing means for measuring, calculating, storing, and using spatial signatures of receivers and transmitters in wireless communication systems to increase system capacity, signal quality, and coverage, and to reduce overall system cost. The antenna array and signal processing means can be employed at base stations (PoPs) and remote terminals. Generally there can be different processing requirements at base stations where many signals are being concentrated than at remote terminals where in general only a limited number of communication links are being managed.

As an example, in a wireless local loop application, a particular base station might serve as a PoP many remote terminals and employ the antenna array and signal processing described herein. Additionally, remote terminals could employ antenna arrays and signal processing to further improve their capacity and signal quality over simpler remote terminals that handle fewer communication links. Herein, the distinction between base stations and remote terminals is that base stations generally act as concentrators connecting to multiple remote units simultaneously, possibly providing a high capacity connection to a wide area network. While for the sake of clarity much of the ensuing discussion is couched in terms of simple remote terminals that do not employ antenna arrays, nothing herein should be interpreted as preventing such an application. Thus, while hereafter spatial signatures will be associated primarily with remote terminals, when antenna arrays are employed at remote terminals, base stations will have associated spatial signatures as well.

Briefly, there are two spatial signatures associated with each remote terminal/base station pair on a particular frequency channel, where for the purpose of this discussion it is assumed that only base stations have antenna arrays. Base stations associate with each remote terminal in their cell a spatial signature related to how that remote terminal receives signals transmitted to it by the base station's antenna array, and a second spatial signature related to how the base station's receive antenna array receives signals transmitted by the remote terminal. In a system with many conventional channels, each remote terminal/base station pair has transmit and receive spatial signatures for each conventional channel.

The receive spatial signature characterizes how the base station antenna array receives signals from the particular remote unit in a particular conventional channel. In one embodiment, it is a complex vector containing responses (amplitude and phase with respect to a reference) of each the antenna element receivers, i.e., for an m-element array, $$a_{br}=[a_{br}(1),a_{br}(2),\ldots,a_{br}(m)]^T, \quad (1)$$

where $a_{br}(i)$ is the response of the $i^{th}$ receiver to a unit power transmitted signal from the remote terminal. Assuming that a narrowband signal $s_r(t)$ is transmitted from the remote terminal, the base station receiver outputs at time t are then given by $$z_b(t)=a_{br}s_r(t-\tau)+n_b(t), \quad (2)$$

where $\tau$ accounts for the mean propagation delay between the remote terminal and the base station antenna array, and $n_b(t)$ represents noise present in the environment and the receivers.

The transmit spatial signature characterizes how the remote terminal receives signals from each of the antenna array elements at the base station in a particular conventional channel. In one embodiment, it is a complex vector containing relative amounts (amplitude and phase with respect to a reference) of each the antenna element transmitter outputs that are contained in the remote terminal receiver output, i.e., for an m-element array, $$a_{rb}=[a_{rb}(1),a_{rb}(2),\ldots,a_{rb}(m)], \quad (3)$$

where $a_{rb}(i)$ is the amplitude and phase (with respect to some fixed reference) of the remote terminal receiver output for a unit power signal transmitted from the $i^{th}$ element in the base station array. Assuming that vector of complex signals $s_b=[s_b(1),\ldots,s_b(m)]^T$ were transmitted from the antenna array, the output of the remote terminal receiver would be given by $$z_r(t)=a_{rb}s_b(t-\tau)+n_r(t), \quad (4)$$

where $n_r(t)$ represents noise present in the environment and the receiver. These spatial signatures are calculated (estimated) and stored at each base station for each remote terminal in its cell and for each conventional channel. For fixed remote terminals and base stations in stationary environments, the spatial signatures can be updated infrequently. In general, however, changes in the RF propagation environment between the base station and the remote terminal can alter the signatures and require that they be updated. Note that henceforth, the time argument in parentheses will be suppressed; integers inside parentheses will be used solely for indexing into vectors and matrices.

In the previous discussion, temporally matched receivers and transmitters were assumed. If there are differences in the temporal responses, these can be equalized using temporal filtering techniques as is wellknown. Furthermore, the channel bandwidths were assumed to be small compared to the center frequency of operation. Large bandwidth channels may require more than one complex vector to accurately describe the outputs as is well known.

When more than one remote terminal wants to communicate at the same time, the signal processing means at the base station uses the spatial signatures of the remote terminals to determine if subsets of them can communicate with the base station simultaneously by sharing a conventional channel. In a system with m receive and m transmit antenna elements, up to m remote terminals can share the same conventional channel at the same time.

When multiple remote terminals are sharing a single conventional uplink channel, the multiple antenna elements at the base station each measure a combination of the arriving uplink signals and noise. These combinations result from the relative locations of the antenna elements, the locations of the remote terminals, and the RF propagation environment. The signal processing means calculates spatial demultiplexing weights to allow the uplink signals to be separated from the combinations of uplink signals measured by the multiple antenna elements.

In applications where different downlink signals are to be sent from the base station to the remote terminals, the signal processing means computes spatial multiplexing weights that are used to produce multiplexed downlink signals, which when transmitted from the antenna elements at the base station result in the correct downlink signal being received at each remote terminal with appropriate signal quality.

In applications where the same signal is to be transmitted from the base station to a large number (more than the number of antenna elements) of remote terminals, the signal processing means computes weights appropriate for broadcasting the signal, covering the area necessary to reach all the remote terminals.

Therefore, the signal processing means facilitates simultaneous communication between a base station and multiple remote terminals on the same conventional channel. The conventional channel may be a frequency channel, a time slot in a time division multiplexed system, a code in a code division multiplexed system, or any combination of the above.

In one embodiment, all elements of a single antenna array transmit and receive radio frequency signals, while in another embodiment the antenna array includes separate transmit antenna elements and receive antenna elements. The number of transmit and receive elements need not be the same. If they are not the same, the maximum number of point-to-point links that can simultaneously be established in one conventional channel is given by the smaller of the two numbers.

The invention and objects and features thereof will be more readily apparent from the following detailed description together with the figures and appended claims.

Figure 1:
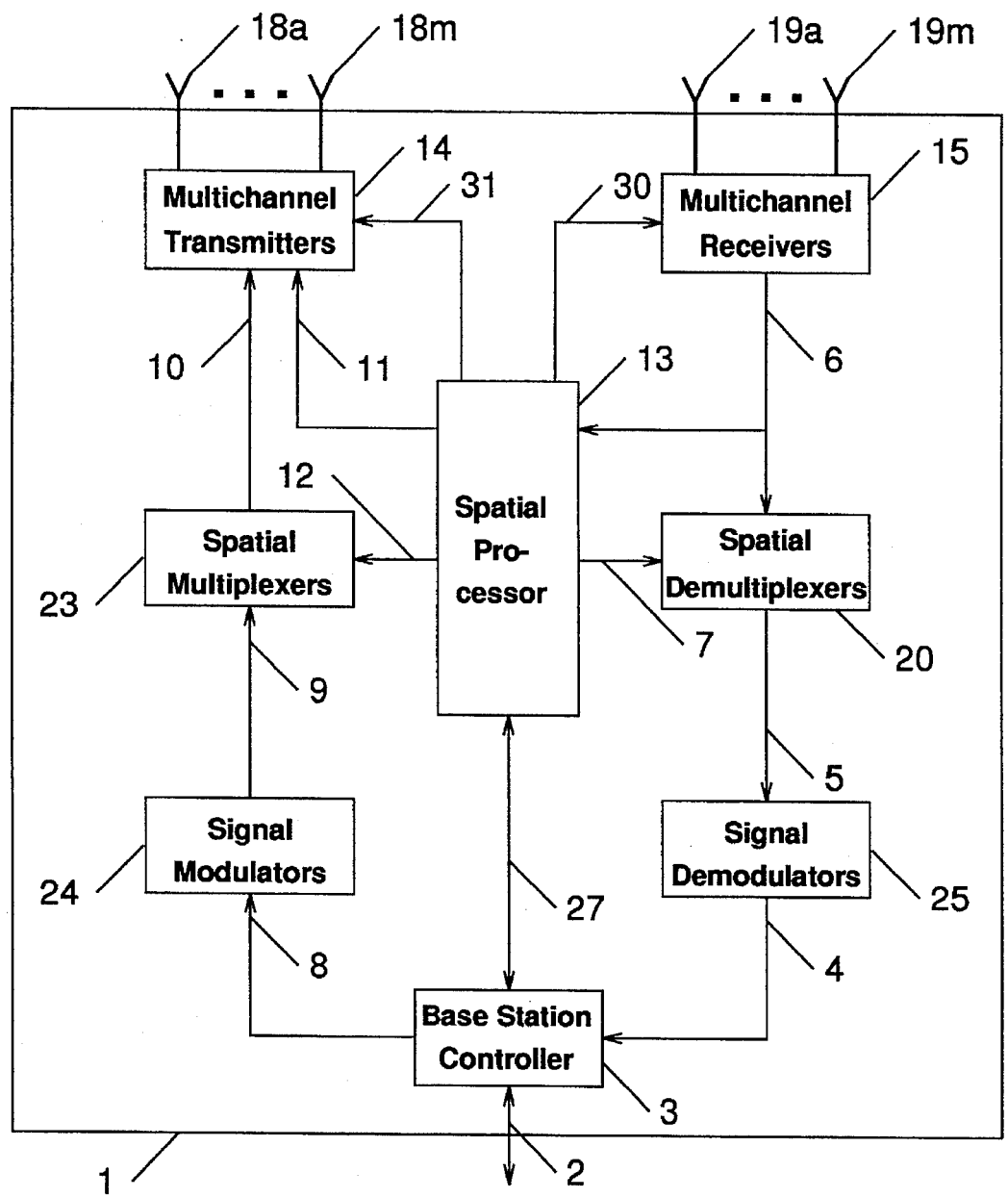
FIG. 1 is a functional block diagram of a base station in accordance with the invention.

List of Reference Numerals
 1. base station
 2. base station communication link
 3. base station controller
 4. alemodulated received signal
 5. spatially separated uplink signals
 6. received signal measurements
 7. demultiplexing weights
 8. data to be transmitted directionally
 9. modulated signal to be multiplexed for transmission
 10. modulated, spatially multiplexed signals to be transmitted
 11. calibration signals to be transmitted
 12. multiplexing weights
 13. spatial processor
 14. multichannel transmitters
 15. multichannel receivers
 16a. multichannel receiver
 16m. multichannel receiver
 17a. multichannel transmitter
 17m. multichannel transmitter
 18a. transmit antenna
 18m. transmit antenna
 19a. receive antenna
 19m. receive antenna
 20. spatial demultiplexer
 21. adder
 22a. multipliers
 22m. multipliers
 23. spatial multiplexer
 24. signal modulator
 25. signal demodulator
 26a. multipliers
 26m. multipliers
 27. spatial control data
 28. spatial parameter data
 29. common receiver oscillator
 30. receiver control data
 31. transmitter control data
 32. common transmitter oscillator
 33. spatial processor controller
 34. active remote terminal list
 35. channel selector
 36. remote terminal database
 37. spatial weight processor
 38. spatial signature processor
 39. remote terminal antenna
 40. remote terminal duplexer
 41. remote terminal duplexer output
 42. remote terminal receiver
 43. remote terminal received signal
 44. remote terminal received calibration signal
 45. remote terminal demodulator
 46. remote terminal demodulated data
 47. remote terminal keyboard and keyboard controller
 48. remote terminal keyboard data
 49. remote terminal display data
 50. remote terminal display and display controller
 51. remote terminal modulator
 52. remote terminal data to be transmitted
 53. remote terminal modulated data to be transmitted
 54. remote terminal transmitter
 55. remote terminal transmitter output
 56. remote terminal transmitter control data
 57. remote terminal receiver control data
 58. remote terminal microphone
 59. remote terminal microphone signal
 60. remote terminal speaker
 61. remote terminal speaker signal
 62. remote terminal central processing unit
 63. remote terminal transponder switch
 64. remote terminal transponder switch control
 65. wide area network
 66. multiple base station controller
 67a. cell boundary
 67b. cell boundary
 67c. cell boundary
 68. high speed message link
 69. remote terminal

DESCRIPTION OF INVENTION

FIG. 1 depicts the preferred embodiment of a base station 1. A base station controller 3 acts as an interface between base station i and any external connection via a base station communication link 2, and serves to coordinate the overall operation of base station 1. In the preferred embodiment, base station controller 3 is implemented with a conventional central processing unit and associated memory and programming.

Incoming or uplink radio transmissions impinge on an antenna array composed of a number, m, of receive antenna elements 19(a, . . . , m) each of whose outputs is connected to one of m multichannel receivers in a bank of phase-coherent multichannel receivers 15. Multichannel receivers 15 have well-matched amplitude and phase responses across the frequency bands of interest, or, as is well known, correction filters are implemented to account for any differences.

The illustrative embodiment describes a conventional frequency division multiple access system. Each multichannel receiver is capable of handling multiple frequency channels. The symbol $N_{cc}$ will be used to reference the maximum number of conventional frequency channels that can be handled by the receivers. Depending on the frequencies allocated for the operation of the wireless communication system and the bandwidths chosen for particular communication links, $N_{cc}$ could be as small as one (a single frequency channel) or as large as thousands. In alternate embodiments, multichannel receivers 15 might instead handle multiple time slots, multiple codes, or some combination of these well known multiple access techniques.

In each conventional channel, receive antenna elements 19(a, . . . , m) each measure a combination of the arriving uplink signals from the remote terminals sharing this conventional channel. These combinations result from the relative locations of the antenna elements, the locations of the remote terminals, and the RF propagation environment, and for narrowband signals are given by equation (2).

Figure 2:
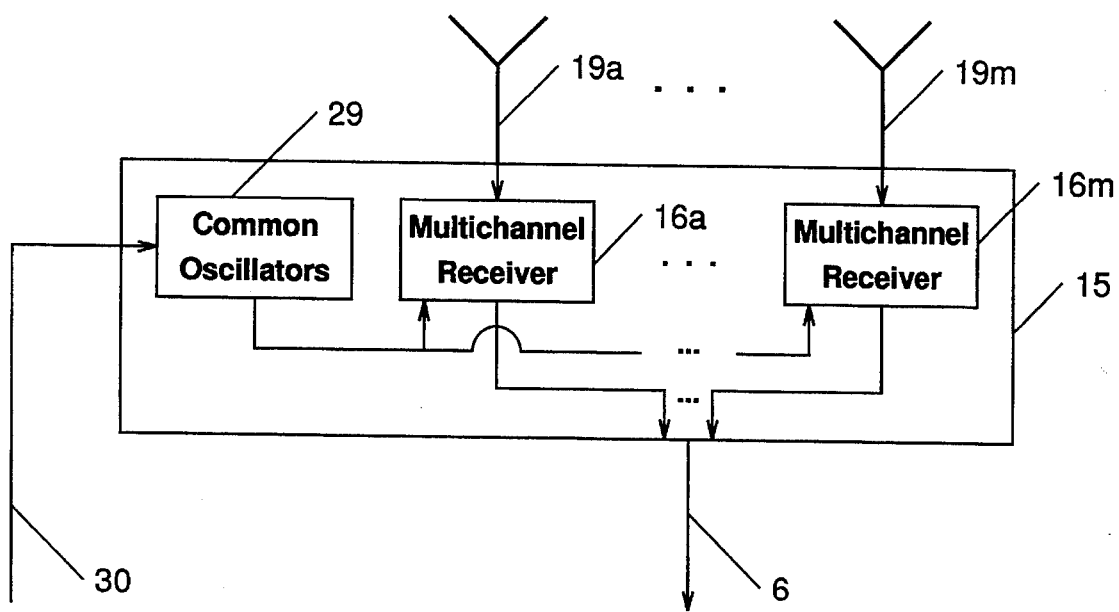
FIG. 2 is a functional block diagram of multichannel receivers in the base station.

FIG. 2 depicts individual multichannel receivers 16(a, . . . , m) with antenna element connections, common local receiver oscillators 29, one for each conventional frequency channel to be used at that base station, and received signal measurements 6. Common local receiver oscillators 29 ensure that the signals from receive antenna elements 19(a, . . . , m) are coherently down-converted to baseband; its $N_{cc}$ frequencies are set so that multichannel receivers 16(a, . . . , m) extract all $N_{cc}$ frequency channels of interest. The frequencies of common local receiver oscillators 29 are controlled by a spatial processor 13 (FIG. 1) via receiver control data 30. In an alternate embodiment, where multiple frequency channels are all contained in a contiguous frequency band, a common local oscillator is used to down-convert the entire band which is then digitized, and digital filters and decimators extract the desired subset of channels using well known techniques.

The illustrative embodiment describes a frequency division multiple access system. In a time division multiple access or code division multiple access system, common oscillators 29 would be augmented to relay common time slot or common code signals respectively from spatial processor 13, via receiver control data 30, to multichannel receivers 16(a, . . . , m). In these embodiments, multichannel receivers 16(a, . . . , m) perform selection of conventional time division channels or conventional code division channels in addition to down conversion to baseband.

Referring again to FIG. 1, multichannel receivers 15 produce received signal measurements 6 which are supplied to spatial processor 13 and to a set of spatial demultiplexers 20. In this embodiment, received signal measurements 6 contain m complex baseband signals for each of $N_{cc}$ frequency channels.

Figure 6:
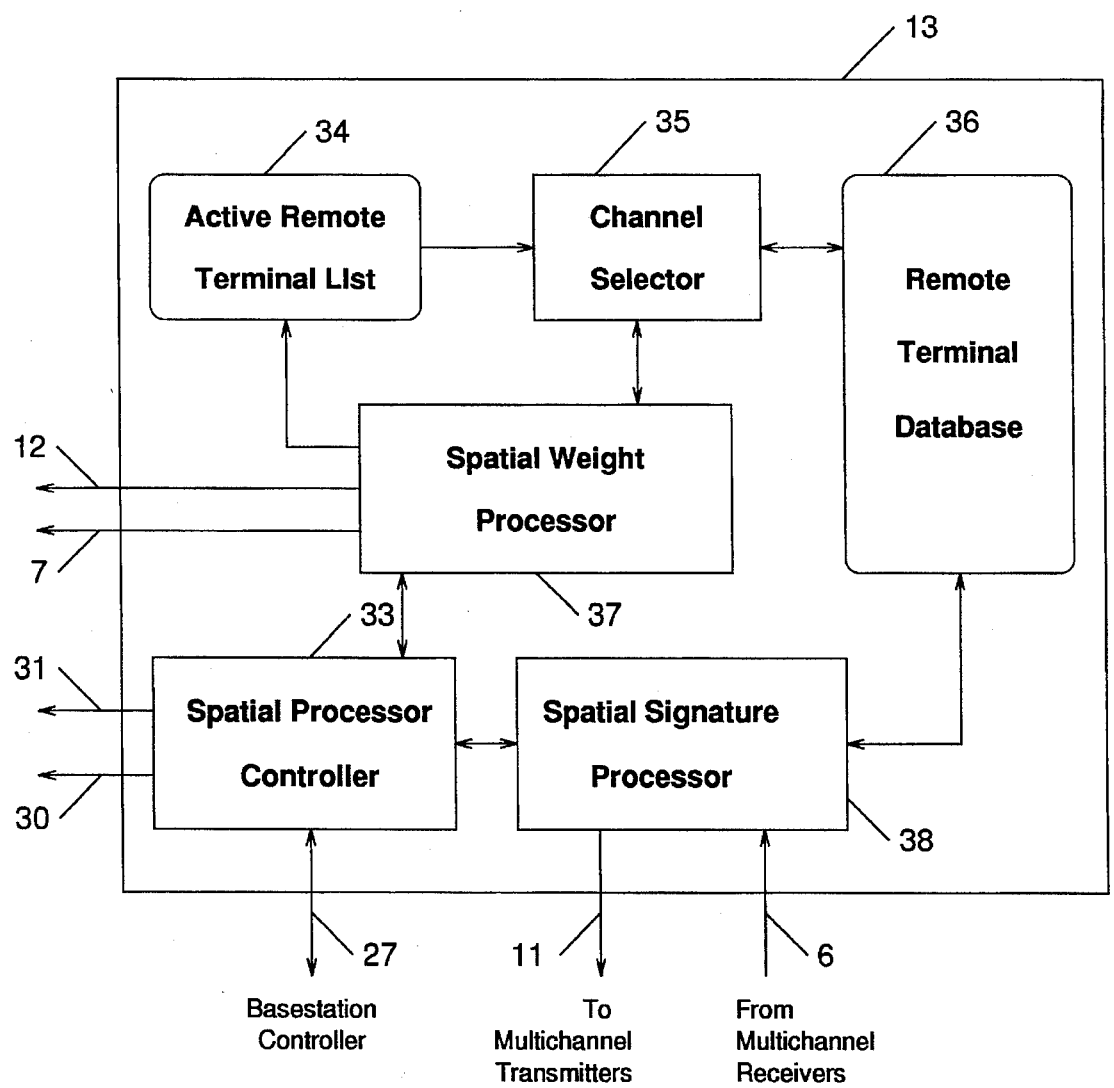
FIG. 6 is a functional block diagram of a spatial processor in the base station.

FIG. 6 shows a more detailed block diagram of spatial processor 13. Spatial processor 13 produces and maintains spatial signatures for each remote terminal for each conventional frequency channel, and calculates spatial multiplexing and demultiplexing weights for use by spatial demultiplexers 20 and spatial multiplexers 23. In the preferred embodiment, spatial processor 13 is implemented using a conventional central processing unit. Received signal measurements 6 go into a spatial signature processor 38 which estimates and updates spatial signatures. Spatial signatures are stored in a spatial signature list in a remote terminal database 36 and are used by channel selector 35 and spatial weight processor 37, which also produces demultiplexing weights 7 and multiplexing weights 12. A spatial processor controller 33 connects to spatial weight processor 37 and also produces receiver control data 30 transmitter control data 31 and spatial control data 27.

Figure 3:
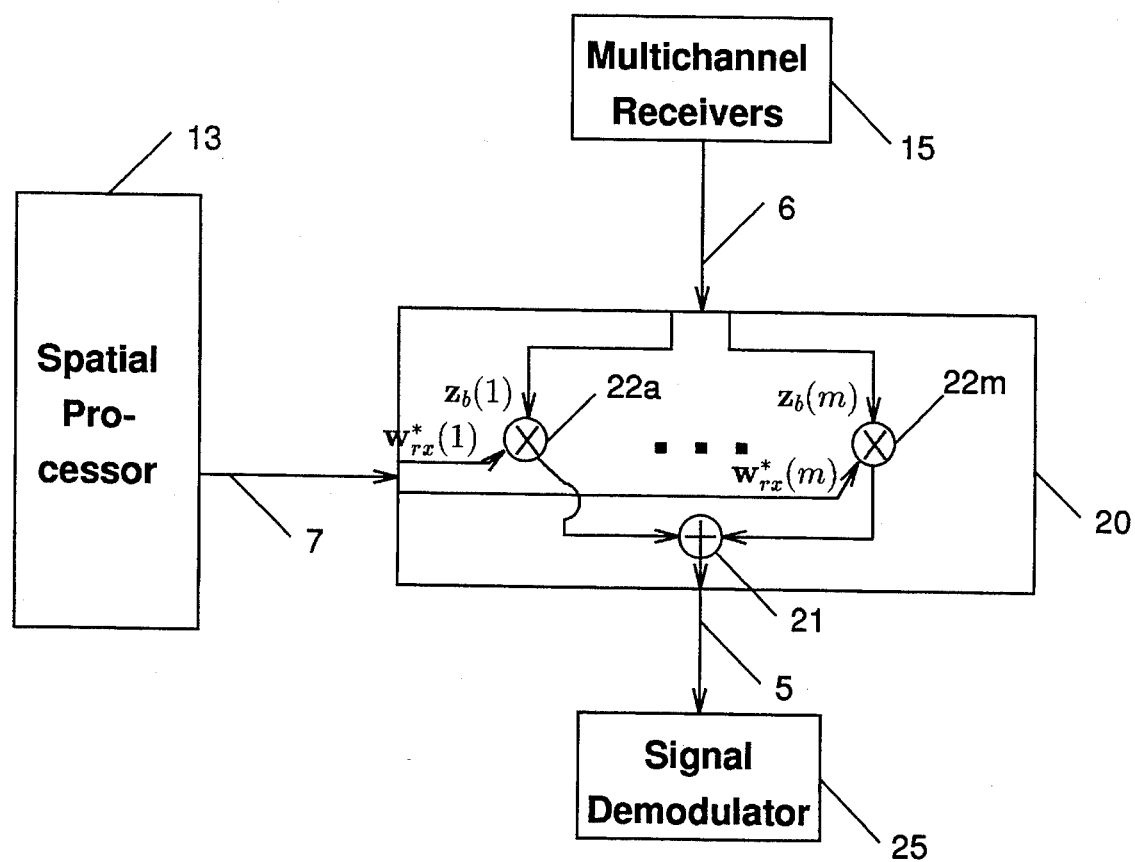
FIG. 3 is a functional block diagram of a spatial demultiplexer in the base station.

Referring again to FIG. 1, spatial demultiplexers 20 combine received signal measurements 6 according to spatial demultiplexing weights 7. FIG. 3 shows a spatial demultiplexer 20 for a single conventional channel. In this embodiment, arithmetic operations in spatial demultiplexer 20 are carried out using general purpose arithmetic chips. In FIG. 3, $z_b(i)$ denotes the $i^{th}$ component of received signal measurement vector 6 for a single conventional channel, and $w^*_{rx}(i)$ denotes the complex conjugate of the $i^{th}$ component of the spatial demultiplexing weight vector 7 for a remote terminal using this conventional channel.

For each remote terminal on each conventional channel, the spatial demultiplexer 20 computes the inner-product of the spatial demultiplexing weights 7 for the conventional channel with the received signal measurements 6:

$$w^*_{rx}z_b = w^*_{rx}(1)z_b(1) + \ldots + w^*_{rx}(m)z_b(m), \tag{5}$$

where $(.)^*$ indicates complex conjugation, numbers inside parentheses indicate element number (e.g., $w_{rx}(i)$ is the $i^{th}$ component of the vector $w_{rx}$), the multiplication is performed by multipliers 22(a, . . . , m), and the addition is performed by adder 21. For each remote terminal on each conventional channel, the output of adder 21 given by equation (5) comprises the spatially separated uplink signals 5.

Referring again to FIG. 1, the outputs of spatial demultiplexers 20 are spatially separated uplink signals 5 for each remote terminal communicating with the base station. Spatially separated uplink signals 5 are demodulated by signal demodulators 25, producing demodulated received signals 4 for each remote terminal communicating with the base station. Demodulated received signals 4 and corresponding spatial control data 27 are available to base station controller 3.

In embodiments where channel coding of the signals sent by remote terminals is performed, base station controller 3 sends the demodulated received signals 4 to spatial processor 13 which, using well known decoding techniques, estimates Bit-Error-Rates (BERs) and compares them against acceptable thresholds stored in the remote terminal database 36. If the BERs are unacceptable, spatial processor 13 reallocates resources so as to alleviate the problem. In one embodiment, links with unacceptable BERs are assigned to new channels using the same strategy as adding a new user with the exception that the current channel is not acceptable unless the current set of users of that particular channel changes. Additionally, recalibration of the receive signature for that remote terminal/base station pair is performed when that conventional channel is available.

For transmission, signal modulators 24 produce modulated signals 9 for each remote terminal the base station is transmitting to, and a set of spatial multiplexing weights 12 for each remote terminal are applied to the respective modulated signals in spatial multiplexers 23 to produce spatially multiplexed signals to be transmitted 10 for each of the m transmit antennas 18(a, . . . , m) and each of the $N_{cc}$ conventional channels.

In the illustrative embodiment the number $N_{cc}$ of downlink conventional channels is the same as the number $N_{cc}$ of uplink conventional channels. In other embodiments, there may be different numbers of uplink and downlink conventional channels. Furthermore, the channels may be of different types and bandwidths as is the case for an interactive television application where the downlink is comprised of wideband video channels and the uplink employs narrowband audio/data channels.

Additionally, the illustrative embodiment shows the same number of antenna elements, m, for transmit and receive. In other embodiments, the number of transmit antenna elements and the number of receive antenna elements may be different, up to and including the case where transmit employs only one transmit antenna element in an omnidirectional sense such as in an interactive television application.

Figure 4:
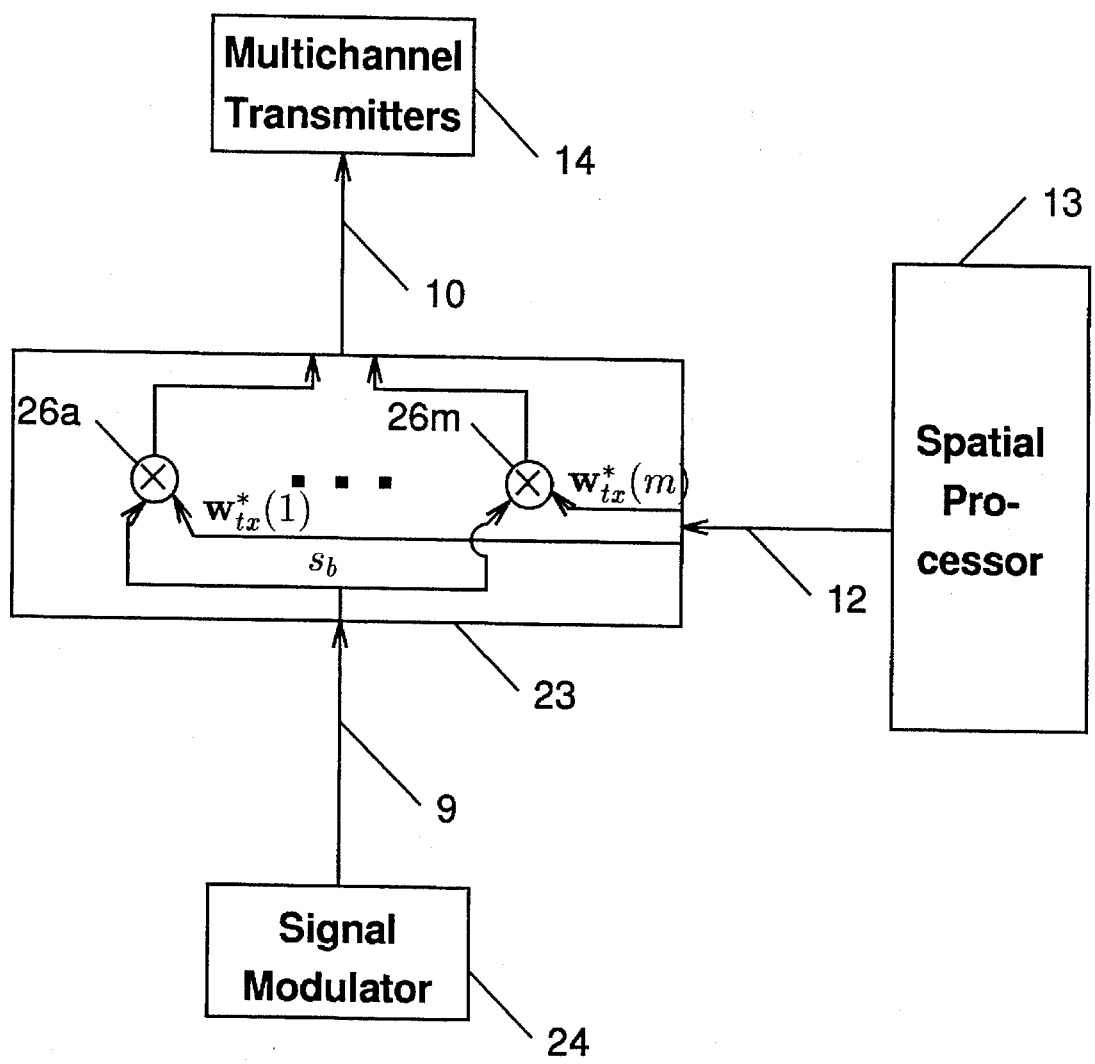
FIG. 4 is a spatial multiplexer.

FIG. 4 shows the spatial multiplexer for one remote terminal on a particular conventional channel. Arithmetic operations in spatial multiplexer 23 are carried out using general purpose arithmetic chips. The component of modulated signals 9 destined for this remote terminal on this conventional channel is denoted by $s_b$, and $w_{tx}(i)$ denotes the $i^{th}$ component of spatial multiplexing weight vector 12 for this remote terminal on this conventional channel.

For each remote terminal on each conventional channel, the spatial multiplexer 23 computes the product of its spatial multiplexing weight vector (from the spatial multiplexing weights 12) with its modulated signal $s_b$ (from the modulated signals 9):

$$w_{tx}^* s_b = \begin{bmatrix} w_{tx}^*(1)s_b \\ \cdot \\ \cdot \\ \cdot \\ w_{tx}^*(m)s_b \end{bmatrix}, \quad (6)$$

where $(.)^*$ indicates complex conjugate (transpose) and the multiplication is performed by multipliers $26(a, \ldots, m)$. For each conventional channel, equation (6) is evaluated by the spatial multiplexer 23 for each remote terminal that is being transmitted to on this conventional channel. Corresponding to each remote terminal is a different multiplexing weight vector and modulated signal. For each conventional channel, spatial multiplexer 23 adds the spatially multiplexed signals for each remote terminal being transmitted to on this conventional channel, producing modulated and spatially multiplexed signals 10 that are the signals to be transmitted for each conventional downlink channel from each antenna.

Figure 5:
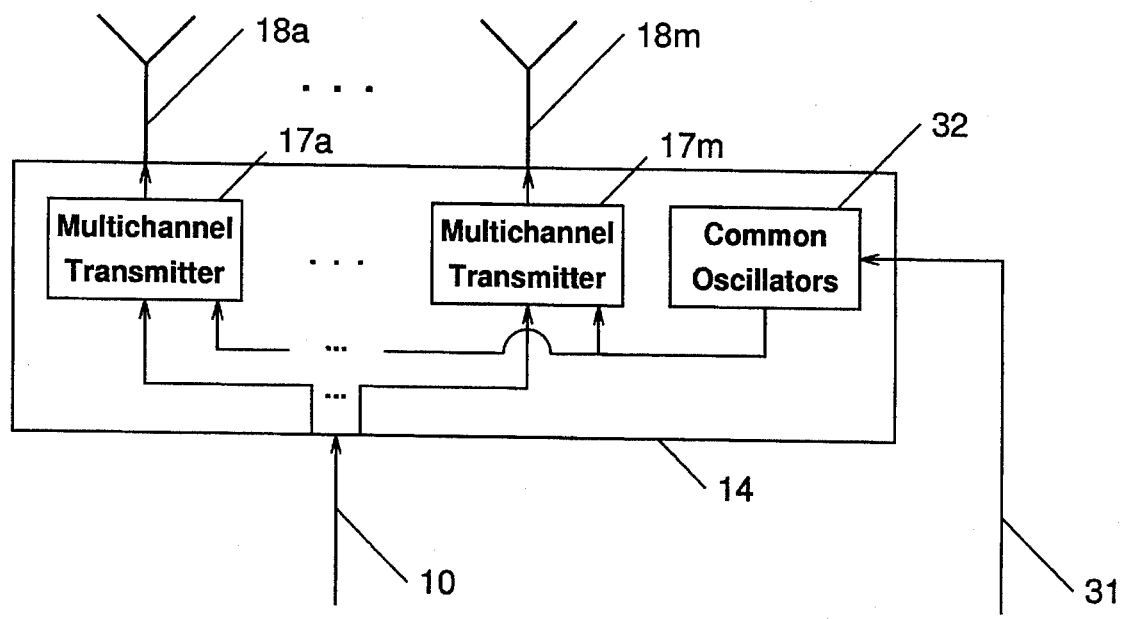
FIG. 5 is a functional block diagram of a multichannel transmitter in the base station.

Modulated and spatially multiplexed signals 10 are inputs to a bank of m phase coherent multichannel transmitters 14. Multichannel transmitters 14 either have well-matched amplitude and phase responses across the frequency bands of interest, or, as is well known, correction filters arc implemented to account for any differences. FIG. 5 depicts multichannel transmitters $17(a, \ldots, m)$ with antenna connections, common local transmitter oscillators 32, and digital inputs 10. Common local transmitter oscillators 32 ensure that the relative phases of spatially multiplexed signals 10 arc preserved during transmission by transmit antennas $18(a, \ldots, m)$. The frequencies of common local transmitter oscillators 32 are controlled by spatial processor 13 (see FIG. 1) via transmitter control data 31.

In an alternate embodiment, spatial multiplexer 23 uses well known baseband multiplexing techniques to multiplex all the calculated conventional channel signals to be transmitted into a single wideband signal to be upconverted and transmitted by each of the multichannel transmitters $17(a, \ldots, m)$. The multiplexing can be performed either digitally or in analog as appropriate.

The illustrative embodiment shows a system with multiple frequency channels. In a time division multiple access or code division multiple access system, common oscillators 32 would be augmented to relay common time slot or common code signals respectively from spatial processor 13, via transmitter control data 31, to multichannel transmitters $17(a, \ldots, m)$.

Referring again to FIG. 1, in applications where transmit spatial signatures arc required, spatial processor 13 is also able to transmit predetermined calibration signals 11 for each antenna on a particular conventional downlink channel. Spatial processor 13 instructs multichannel transmitters $17(a, \ldots, m)$, via transmitter control data 31, to transmit predetermined calibration signals 11 in place of spatially multiplexed signals 10 for a particular conventional downlink channel. This is one mechanism used for determining the transmit spatial signatures of the remote terminals on this conventional downlink channel.

In alternate embodiments where well known channel coding techniques are used to encode the signals to be transmitted to remote terminals, remote terminals employ well known decoding techniques to estimate BERs which are then reported back to the base station on their uplink channel. If these BERs exceed acceptable limits, corrective action is taken. In one embodiment, the corrective active involves reallocating resources by using the same strategy as adding a new user with the exception that the current channel is not acceptable unless the current set of users of that particular channel changes. Additionally, recalibration of the transmit signature for that remote terminal/base station pair is performed when that conventional channel is available.

Figure 7:
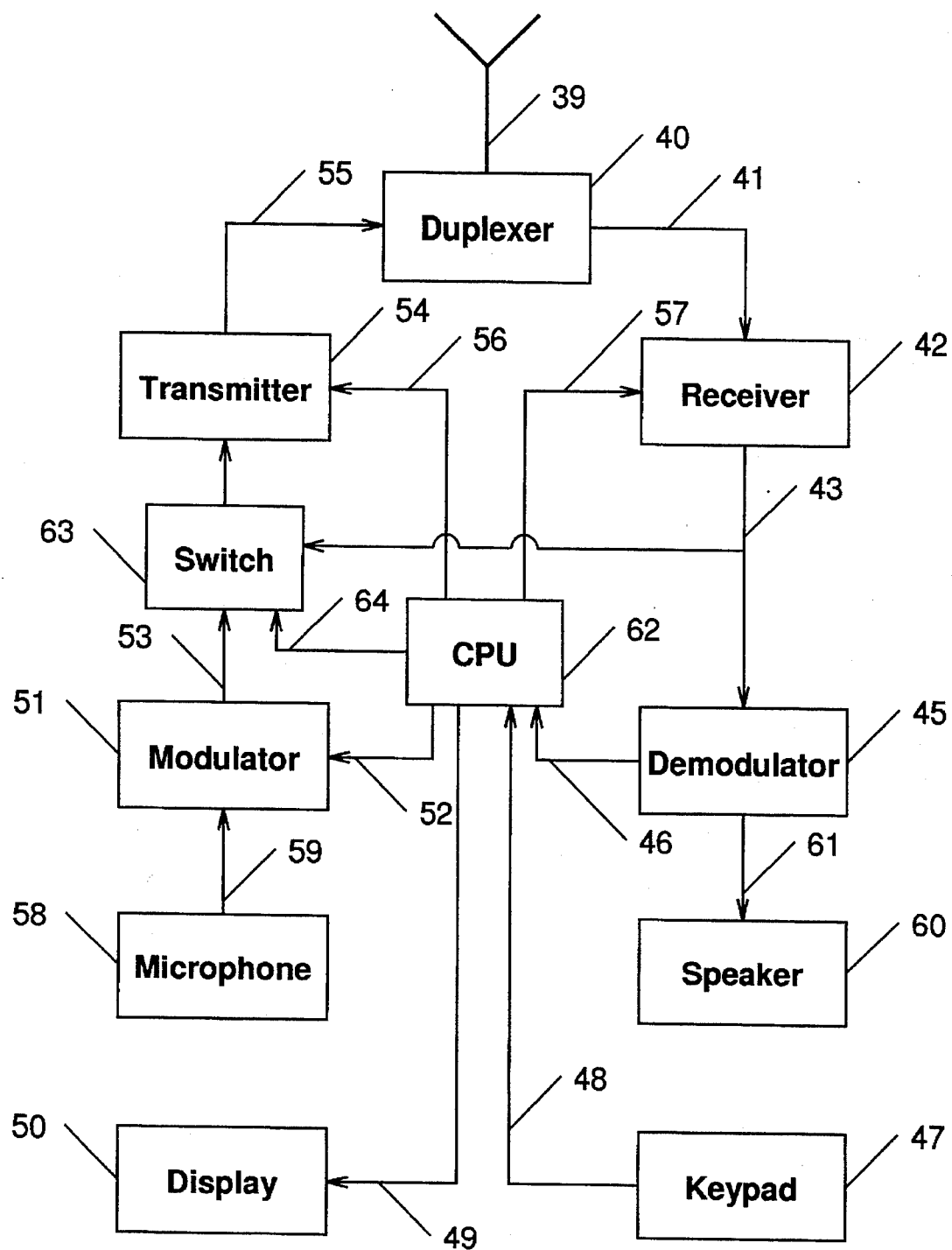
FIG. 7 is a functional block diagram of a remote terminal with a transponder switch.

FIG. 7 depicts the component arrangement in a remote terminal that provides voice communication. The remote terminal's antenna 39 is connected to a duplexer 40 to permit antenna 39 to be used for both transmission and reception. In an alternate embodiment, separate receive and transmit antennas are used eliminating the need for duplexer 40. In another alternate embodiment where reception and transmission occur on the same frequency channel but at different times, a transmit/receive (TR) switch is used instead of a duplexer as is well known. Duplexer output 41 serves as input to a receiver 42. Receiver 42 produces a down-converted signal 43 which is the input to a demodulator 45. A demodulated received voice signal 61 is input to a speaker 60.

Demodulated received control data 46 is supplied to a remote terminal central processing unit 62 (CPU). Demodulated received control data 46 is used for receiving data from base station 1 during call setup and termination, and in an alternate embodiment, for determining the quality (BER) of the signals being received by the remote terminal for transmission back to the base station as described above.

Remote terminal CPU 62 is implemented with a standard microprocessor. Remote terminal CPU 62 also produces receiver control data 57 for selecting the remote terminal's reception channel, transmitter control data 56 for setting the remote terminal's transmission channel and power level, control data to be transmitted 52, and display data 49 for remote terminal display 50. Remote terminal CPU 62 also receives keyboard data 48 from remote terminal keyboard 47.

The remote terminal's voice signal to be transmitted 59 from microphone 58 is input to a modulator 51. Control data to be transmitted 52 is supplied by remote terminal CPU 62.

Control data to be transmitted 52 is used for transmitting data to base station 1 during call setup and termination as well as for transmitting information during the call such as measures of call quality (e.g., bit error rates (BERs)). The modulated signal to be transmitted 53, output by modulator 51, is up-converted and amplified by a transmitter 54, producing a transmitter output signal 55. Transmitter output 55 is then input to duplexer 40 for transmission by antenna 39.

In an alternate embodiment, the remote terminal provides digital data communication. Demodulated received voice signal 61, speaker 60, microphone 58, and voice signal to be transmitted 59 are replaced by digital interfaces well-known in the art that allow data to be transmitted to and from an external data processing device (for example, a computer).

Referring again to FIG. 7, the remote terminal allows received data 43 to be transmitted back to base station 1 via switch 63 controlled by remote terminal CPU 62 through switch control signal 64. In normal operation, switch 63 drives transmitter 54 with modulated signal 53 of modulator 51. When the remote terminal is instructed by base station 1 to enter calibration mode, remote terminal CPU 62 toggles switch control signal 64, which instructs switch 63 to drive transmitter 54 with received data 43.

Figure 8:
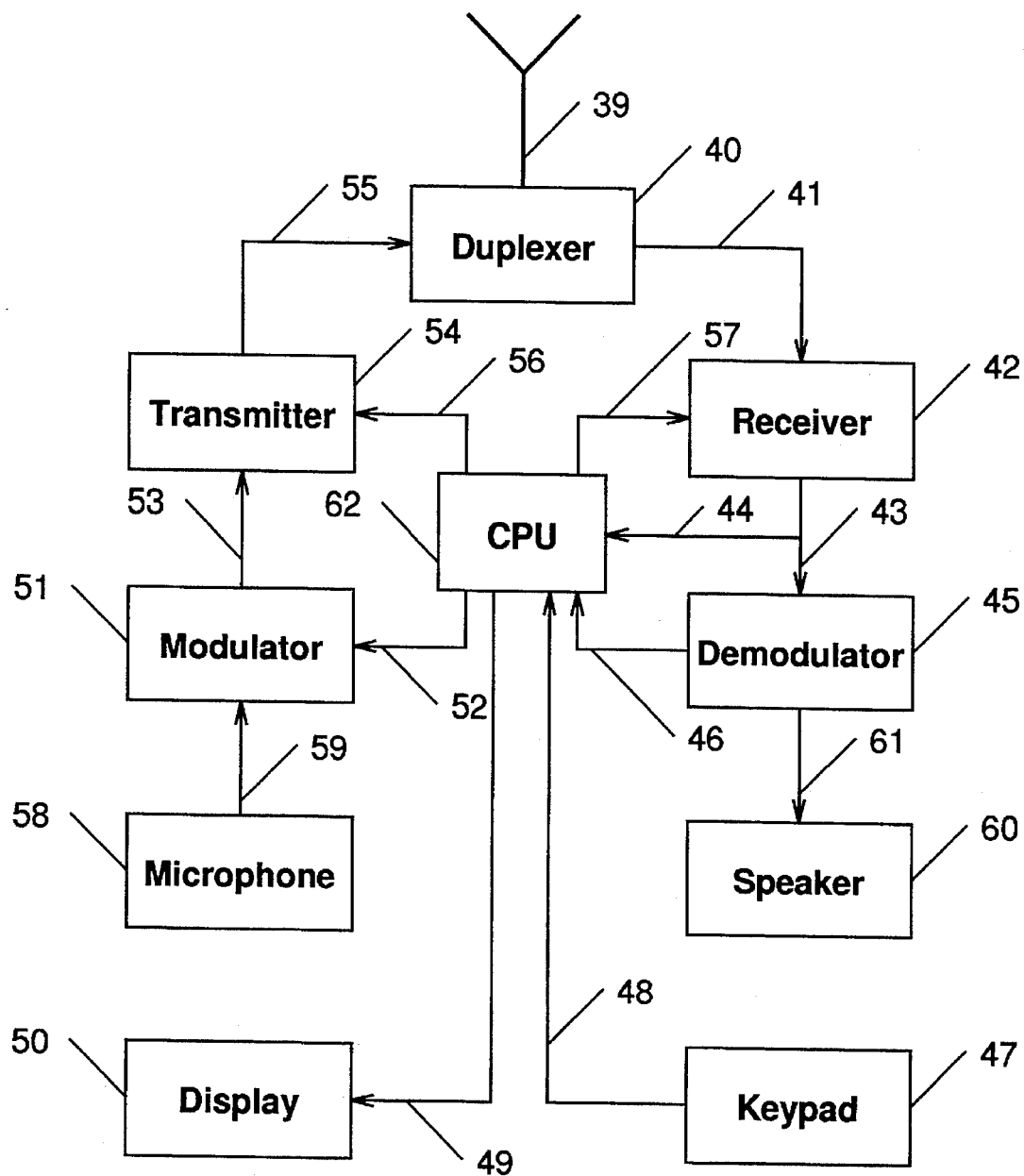
FIG. 8 is a functional block diagram of a remote terminal.

FIG. 8 shows an alternate embodiment of the remote terminal calibration function. Switch 63 of FIG. 7 is no longer used. Instead, the output of receiver 42 is supplied to remote terminal CPU 62 by data connection 44. In normal operation remote terminal CPU 62 ignores data connection 44. In calibration mode, remote terminal CPU 62 uses data connection 44 to compute the remote terminal's transmit spatial signature, which is transmitted back to base station 1 through modulator 51 and transmitter 54 as control data to be transmitted 52.

In an alternate embodiment, special calibration procedures in the remote terminal are not required. In many conventional wireless protocol standards, remote terminals regularly report received signal strength or receive signal quality back the base station. In this embodiment, the received signal strength reports are sufficient to compute the remote terminal's transmit spatial signature, as described below.

OPERATION OF INVENTION

General Principles—Base Station

In many respects, the spectrally efficient base station shown in FIG. 1 behaves much like a standard wireless communication system base station. The primary distinction is that the spectrally efficient base station supports many more simultaneous conversations than it has conventional communication channels. The conventional communication channels may be frequency channels, time channels, code channels, or any combination of these. The spatial multiplexer/demultiplexer increases the system capacity by allowing multiple spatial channels on each of these conventional channels. Moreover, by combining signals from multiple receive antennas, the spatial demultiplexer 20 produces spatially separated uplink signals 5 that have substantially improved signal-to-noise, reduced interference, and improved quality in multipath environments compared to a standard base station.

In the illustrative embodiment, a wireless communication system comprised of multiple remote terminals and base stations incorporating antenna arrays and spatial signal processing is described. Such systems have application, for example, in providing wireless access to the local PSTN.

Information transfers (or calls) are initiated by either a remote terminal or by communication link 2 through base station controller 3. Call initialization takes place on a downlink and uplink control channel as is well known in the art. In the present embodiment, the downlink control channel is transmitted using transmission antennas $18(a, \ldots, m)$. In an alternate embodiment, the downlink control channel is broadcast from a single, omnidirectional antenna. Base station controller 3 passes the identification of the remote terminal to be involved in the call to spatial processor 13 which uses the stored spatial signatures of that remote terminal to determine which conventional communication channel the remote terminal should use. The selected channel may already be occupied by several remote terminals, however spatial processor 13 uses the spatial signatures of all of the remote terminals on that channel to determine that they can share the channel without interference. In a system with m receive and m transmit antenna elements, up to m remote terminals can share the same conventional channel. More generally, the number of point-to-point full-duplex communication links that can occupy the same conventional channel at the same time is given by the smaller of the number of receive and transmit elements.

Spatial processor 13 uses calculated spatial multiplexing and demultiplexing weights for the selected channel and the remote terminal in question to configure spatial multiplexer 23 and spatial demultiplexer 20. Spatial processor 13 then informs controller 3 of the selected channel. As in a conventional base station, controller 3 then commands the remote terminal (via the downlink control channel) to switch to the selected channel for continued communications. In the event that the remote terminal has power control capabilities, as is well known in the art, controller 3 also commands the remote terminal to adjust its power to an appropriate level based on parameters such as the power levels of the other remote terminals sharing the same conventional channel and the required signal quality for each link as discussed below. At the termination of communications, the remote terminal returns to its idle state where it monitors the downlink control channel awaiting its next call. This frees up that "spatial channel" for another remote terminal.

Spatial Processing—Base Station

FIG. 6 shows a block diagram of spatial processor 13. It is controlled by spatial processor controller 33, which interfaces to base station controller 3 via link 27. Spatial processor controller 33 controls the gain and frequency settings of multichannel transmitters 14 and multichannel receivers 15 by control lines 31 and 30.

Spatial processor 13 maintains an active remote terminal list 34 that catalogs which remote terminals are currently using each conventional communication channel as well as their current transmit power levels. Other parameters of the remote terminals such as modulation formats currently used, receiver noise levels in current frequency channels, and current signal quality requirements are stored as well. Spatial processor 13 also maintains a spatial signature list in the remote terminal database 36, which in alternate embodiments includes remote terminals' power control levels, allowed conventional frequency channels for receive and transmit, and list of modulation formats understood.

The spatial signature list in the remote terminal database 36 contains a transmit spatial signature, $a_{rb}$, and a receive spatial signature, $a_{br}$, for every frequency of operation for each remote terminal. In another embodiment, estimates of the quality (e.g., estimate error covariances) of the spatial signatures are stored as well. As aforementioned, the transmit spatial signature, $a_{rb}$, for a particular remote terminal and a particular frequency channel is defined as the vector of relative complex signal amplitudes that would be seen arriving at that particular remote terminal as a result of identical (equal amplitude and phase) unit power narrow band signals, at that particular frequency, being transmitted through multichannel transmitters 14 and transmission antennas 18$(a, \ldots, m)$. The transmit spatial signature includes the effects of the propagation environment between the base station and the remote terminal, as well as any amplitude and phase differences in multichannel transmitters 14, antenna cables, and transmission antennas 18$(a, \ldots, m)$. The receive spatial signature, $a_{br}$, for a particular remote terminal and a particular frequency channel, is defined as the vector of complex signal amplitudes that would be measured at the outputs of multichannel receiver 16 given a single unit power narrow band signal being transmitted by that particular remote terminal, at that particular frequency.

When the base station controller 1 forwards a call initialization request for a particular remote terminal via link 27, a channel selector 35 searches active remote terminal list 34 to find a conventional communication channel that can accommodate the remote terminal. In the preferred embodiment, there is a receive active remote terminal list and a transmit active remote terminal list which are used by channel selector 35 in forming both a multiplexing and a demultiplexing spatial signature matrix for each conventional channel. For each conventional channel, the columns of the demultiplexing and rows of the multiplexing spatial signature matrices are the stored receive and transmit spatial signatures of each of the remote terminals currently active on (using) that channel plus one more column containing the appropriate spatial signature of the remote terminal requesting a communication channel.

The multiplexing spatial signature matrix for each channel, $A_{rb,p}$ (where p denotes the conventional channel number), is formed using transmit spatial signatures as shown in equation (7):

$$A_{rb,p} = \begin{bmatrix} a_{rb,p}^1 \\ \vdots \\ a_{rb,p}^{n_p} \end{bmatrix}, \tag{7}$$

where $a_{rb,p}^i$ is the transmit spatial signature for $i^{th}$ remote terminal assigned to channel p and $n_p$ is the total number of remotes on conventional channel p.

The demultiplexing spatial signature matrix, $A_{br,p}$, is formed using receive spatial signatures as shown in equation (8):

$$A_{br,p} = [a^1{}_{br,p}, a^2{}_{br,p}, \ldots, a^{n_p}{}_{br,p}], \tag{8}$$

where $a_{br,p}^i$ is the receive spatial signature for $i^{th}$ remote terminal assigned to channel p.

Channel selector 35 calculates functions of these signature matrices to assess whether or not communication between the base station and the new remote terminal can be successfully carried out on the selected conventional channel. In the preferred embodiment, channel selector 35 first calculates spatial multiplexing and demultiplexing weights for that remote terminal and then uses these weights to estimate link performance.

In the illustrative embodiment, spatial multiplexing weights are the rows of a matrix $W_{tx}$ given in equation (9):

$$W_{tx} = S_b (A_{rb} A^*{}_{rb})^{-1} A_{rb}, \tag{9}$$

where $(.)^{-1}$ is the inverse of a matrix, $(.)^*$ is the complex conjugate transpose of a matrix, $A_{rb}$ is the multiplexing spatial signature matrix $A_{rb,p}$ associated with the relevant conventional channel, and $S_b$ is a (diagonal) matrix containing the amplitudes of the signals to be transmitted. The amplitudes to be transmitted, $S_b$, are calculated in the preferred embodiment using the (diagonal) matrix of remote terminal receiver mean-square noise voltages (N) and the diagonal matrix of minimum desired signal qualities $(SNR_{des})$ as given in equation (10):

$$S_b = (SNR_{des} \times N)^{1/2} \tag{10}$$

Now channel selector 35 calculates the average mean-square voltage (power) $\overline{P}_b$ to be transmitted from each element as the sum of squares of the elements in each row of $W_{tx}$, i.e., $$\overline{P}_b = \text{diag}\{W_{tx} W^*{}_{tx}\}. \tag{11}$$

and the peak square voltage (power) $p^{peak}{}_b$ to be transmitted from each element as the square of sum of the magnitude of the elements in each row of $W_{tx}$, i.e., $$P^{peak}{}_b = \text{diag}\{\text{abs}(W_{tx}) I \text{abs}(W^*{}_{tx})\}, \tag{12}$$

where I is a matrix of all ones of the appropriate size and abs(.) is elementwise absolute value. Channel selector 35 compares these values against the limits for each of the transmitters for each of the elements. If any of the average or peak values exceed the acceptable limits, the remote terminal in question is not assigned to the candidate channel. Otherwise, the ability to successfully receive from the remote terminal is checked. In an alternate embodiment, the transmitter limits are used as inequality constraints in an optimization algorithm for calculating transmit weights that meet the specifications given and that also result in the minimum amount of transmitted power possible. If transmit weights satisfying the constraints can not be found, the remote terminal in question is not assigned to the candidate channel. Such optimization algorithms are well known.

To test the uplink, channel selector 35 calculates spatial demultiplexing weights $W_{rx}$ using $A_{br}$, the demultiplexing spatial signature matrix $A_{br,p}$ associated with the relevant conventional channel, as given for the preferred embodiment in equation (13):

$$W_{rx} = (A_{br} P_r A^*{}_{br} + R_{nn})^{-1} A_{br} P_r, \tag{13}$$

where $P_r$ is a (diagonal) matrix of mean-square amplitudes (powers) transmitted by the remote terminals and $R_{nn}$ is the base station receiver noise covariance. Then, the expected value of the normalized mean-squared error covariance is calculated in one embodiment as follows:

$$\overline{MSE} = P^{-1/2}{}_r ((I - W^*{}_{rx} A_{br}) P_r (I - W^*{}_{rx} A_{br})^* + W^*{}_{rx} R_{nn} W_{rx}) P^{-*1/2}{}_r \tag{14}$$

The notation $(.)^{-*1/2}$ indicates complex conjugate transpose of the square root of the matrix. The inverse of MSE is an estimate of the expected Signal-to-Interference-plus-Noise Ratio (SINR) at the output of the spatial demultiplexer:

$$\overline{SINR} = \overline{MSE}^{-1}. \tag{15}$$

If all of the diagonal elements of $\overline{SINR}$ are above the desired thresholds based on the signal quality required to be received from each remote terminal, the remote terminal is allowed access to the channel. If the candidate remote terminal is below its threshold and has the ability to increase its output power, the same computations are again performed for increasing remote terminal power output until either the maximum output power for that remote terminal is reached and the $\overline{\text{SINR}}$ is still insufficient, another remote terminal $\overline{\text{SINR}}$ falls below its threshold in which case its power is increased if possible, or all thresholds are exceeded. If acceptable remote terminal transmit powers can be found, the remote terminal is granted access to this particular conventional channel, otherwise it is denied access and another conventional channel is checked.

In an alternate embodiment, the calculation of demultiplexing weights is performed using well known optimization procedures with the objective of minimizing remote terminal transmit powers subject to estimated signals at the base station meeting or exceeding their minimum desired SINR's.

Also, in an alternate embodiment, in the case that no conventional channel can be found to accommodate the remote terminal, channel selector 35 calculates whether some rearrangement of the existing remote terminals among the conventional channels would allow the remote terminal to be supported on some conventional channel. In this case, the remote terminal will only be denied communication at this time if no rearrangement of existing users allows the remote terminal to be accommodated.

In an alternate embodiment employing frequency division duplexing (FDD), remote terminals are not restricted to being assigned a fixed conventional channel pair for transmit and receive. A sufficiently flexible system architecture is employed where channel selector 35 may choose to assign a particular remote to transmit and receive conventional channels separated by different frequency duplex offsets in order to minimize overall system interference levels.

Spatial multiplexing and demultiplexing weights for remote terminals already using a conventional channel must be recalculated because adding a new remote terminal to that conventional channel may change them significantly. In the preferred embodiment, channel selector 35, having already done the necessary calculations, sends the new spatial multiplexing and demultiplexing weights to the spatial weight processor 37 for use in setting up the spatial multiplexer 23 and demultiplexer 20. In an alternate embodiment, spatial weight processor 37 uses the spatial signature matrices sent to it by channel selector 35 to calculate different sets of spatial multiplexing and demultiplexing weights for all of the remote terminals on that conventional channel.

Spatial weight processor 37 then sends the new spatial demultiplexing weights to spatial demultiplexers 20 and the new spatial multiplexing weights to the spatial multiplexers 23 for this conventional channel, updates the active remote terminal list 34, and informs spatial processor controller 33 which in turn informs base station controller 3 of the selected channel. Base station controller 3 then transmits a message to the remote terminal using the downlink control channel that instructs the remote terminal to switch to the desired conventional channel.

It can be shown from equation (9) that the multiplexing weight matrices $W_{tx}$, have the property:

$$A_{rb}W^*_{tx}=S_b. \tag{16}$$

This means that at the $i^{th}$ remote terminal, the signal intended to be sent to that terminal is received with a sufficient (positive real) amplitude $S_b(i,i)$. The fact that $S_b$ has zero off-diagonal elements means that at the $i^{th}$ remote terminal, none of the other signals being transmitted are received by that remote terminal. In this manner, each remote terminal receives only the signals intended for it at the necessary power levels to ensure proper communications. In alternate embodiments, uncertainties in the estimates of $A_{rb}$ are incorporated in setting base station transmit power levels and calculating weights so as to minimize the effect of errors and/or changes in $A_{rb}$.

Similarly, at the base station the particular demultiplexing weight matrices given in (13) have the property that conditioned on the knowledge of the receive spatial signatures and the transmitted voltages (powers) from the remote terminals, the estimated signals $\hat{S}$ given by:

$$\hat{S}=W^*_{rx}z_b, \tag{17}$$

are the most accurate in the sense of least mean-squared error. In particular, they most closely match the signals transmitted by the remote terminals given the measurements made at the base station by the multiple antenna elements.

Equations (9) and (13) represent only one way to calculate spatial multiplexing and demultiplexing weights. There are other similar strategies that demonstrate properties similar to those shown in equation (16) and described in the previous paragraph. Other well known techniques for calculating weight matrices $W_{tx}$ and $W_{rx}$ account for uncertainty in spatial signature matrices $A_{rb}$ and $A_{br}$, for wide bandwidth conventional channels, and can incorporate more complex power and dynamic range constraints.

Determining Spatial Signatures

As shown in FIG. 6, spatial processor 13 also contains a spatial signature processor 38 for finding the spatial signatures of the remote terminals. In the illustrative embodiment, spatial signature processor 38 uses the calibration techniques described in copending U.S. patent application Ser. No. 08/234,747.

In the illustrative embodiment, each remote terminal is capable of entering a calibration mode in which the signal received by the remote terminal 43 is transmitted back to base station 1. Referring to FIG. 7, this function is provided by switch 63 controlled by remote terminal CPU 62 through switch control signal 64.

To determine the transmit and receive spatial signatures of a remote terminal, spatial signature processor 38 commands the remote terminal to enter calibration mode by transmitting a command to it on the downlink channel. This command is generated by base station controller 3, based on a request from spatial processor controller 33, and modulated by signal modulators 24. Spatial signature processor 38 then transmits predetermined calibration signals 11, on the conventional channel occupied by the remote terminal, by instructing multichannel transmitters 17($a, \ldots, m$) via transmitter control data 31 and spatial processor controller 33. In the present embodiment, the m signals (for each antenna) among the predetermined calibration signals 11 are different frequency complex sinusoids. In another embodiment, the predetermined calibration signals 11 are any known, distinct, signals.

The remote terminal shown in FIG. 7 transmits back the signal received at the remote terminal. This transponded signal is received by multichannel receivers 15 in base station 1 shown in FIG. 1 and supplied to spatial signature processor 38 shown in FIG. 6. In one embodiment described in patent application Ser. No. 08/234,747, spatial signature processor 38 computes the receive and transmit spatial signatures of the remote terminal from the received signal measurements 6 and predetermined calibration signals 11 as follows. Time samples of the received data are stored in an m by n data matrix Z which in the absence of noise and parameter offsets is given by $$Z = k a_{br} a_{rb} S, \quad (18)$$

where S is the m by n matrix of predetermined calibration signals and k is a known amount by which the signal is amplified in the remote terminal before transmission back to the base station. The receive spatial signature is proportional to the singular vector ($u_1$) corresponding to the largest singular value ($\sigma_{max}$ of the data matrix Z. Transmission of a unit power signal from the remote terminal and received by the base station at antenna element 1 provides the necessary scaling $g_{br}$ for the receive spatial signature $$a_{br} = g_{br} u_1 / u_1(1), \quad (19)$$

where $u_1(1)$ is the first element of $u_1$. Once $a_{br}$ is known, $a_{rb}$ is calculated by $$a_{rb} = k^{-1} (g_{br} u_1 / u_1(1))' Z S'. \quad (20)$$

where $B'$ is the well known Moore-Penrose pseudo-inverse of the matrix B satisfying $BB' = I$ (the identity matrix) for full-rank matrices B having more columns than rows, $B'B = I$ for full-rank matrices B having more rows than columns. In alternate embodiments also described in copending application Ser. No. 08/234,747, well known techniques are used to account for noise present in the system and parameter variations such as oscillator frequency offsets.

Spatial signature processor 38 stores the new spatial signatures in remote terminal database 36. Upon completion, spatial signature processor 38 commands the remote terminal to exit calibration mode by transmitting a command to it on the downlink channel.

In one alternate embodiment, computation of remote terminal transmit spatial signatures can be performed directly by the remote terminals. This embodiment of the remote terminal is shown in FIG. 8. In calibration mode, spatial signature processor 38 transmits predetermined calibration signals 11, on the conventional channel to be calibrated by the remote terminals, as before. Remote terminal CPU 62 uses received calibration signals 44 and the known transmitted waveforms to compute the remote terminal's transmit spatial signature using the same techniques used by spatial signature processor 38 in the previous embodiment. The computed transmit spatial signature is transmitted back to base station I through modulator 51 and transmitter 54 as control data to be transmitted 52. When received by base station 1, spatial signature processor 38 stores the new transmit spatial signature in remote terminal database 36. Since each remote terminal performs the transmit spatial signature calculation independently, this arrangement allows multiple remote terminals to compute their own transmit spatial signature simultaneously on the same conventional channel. In this embodiment, remote terminal receive spatial signatures are computed by spatial signature processor 38 in the same manner as in the previous embodiment.

Using these techniques, spatial signature processor 38 can measure a remote terminal transmit and receive spatial signatures for a particular channel any time that channel is idle. The efficiency of these calibration techniques allow spatial signature processor 38 to update the spatial signatures of numerous remote terminals for a particular channel while occupying that channel for only a short time.

Many other techniques for obtaining spatial signatures of remote terminals are also available. In some RF environments, spatial signatures for remote terminals can be determined using well-known techniques that depend upon knowledge of the geometric arrangement of the m reception antennas 19(a, ..., m) and their individual directivity patterns (element gain and phase, with respect to a reference, as a function of angle-of-arrival), and the direction from the base station to the remote terminal. Furthermore, techniques such as ESPRIT (U.S. Pat. Nos. 4,750,147 and 4,965,732) can be used to estimate directions in applications where they are not known a priori.

Similarly, as is well known, knowledge of any predetermined modulation format parameters of the underlying signals being transmitted by the remote terminals (for example, knowledge of certain training or preamble sequences, or knowledge that the signals are constant modulus) can also be used to determine the receive spatial signatures for remote terminals. A further example is decision-directed feedback techniques, also well known in the art, where receive data is demodulated and then remodulated to produce an estimate of the original modulated signal. These techniques allow receive spatial signatures to be estimated even when multiple remote terminals are occupying a single conventional channel.

In some RF environments, transmit spatial signatures for remote terminals can be calculated explicitly, as is well known, using knowledge of the remote terminal locations and the locations and directivity patterns of the base station transmit antennas. This requires no special capability on the part of the remote terminal.

If the remote terminal has the ability to measure and report the strength of the signal it is receiving, the system can use this information to derive transmit spatial signatures, albeit in a less efficient manner than the embodiment shown in FIG. 7 where the remote terminal has full transponder capabilities, or the embodiment shown in FIG. 8 where the remote terminal directly computes its transmit spatial signature. The transmit spatial signature is determined based solely on received signal power reports from the remote terminal as follows. First, spatial signature processor 38 transmits identical unit power signals from two of the m antenna elements at a time. Spatial signature processor 38 then changes the amplitude and phase of one of the two signals until the remote terminal reports that it is receiving no signal. The set of complex weights for antenna elements 2 through m required to null a unit power signal from element 1 are changed in sign and inverted to produce the transmit spatial signature for the remote terminal.

In yet another embodiment, the system can be designed to continuously update the spatial signatures of the remote terminals in a "closed loop" manner. This is done to account for the time variation of spatial signatures due to, for example, motion of the remote terminal or changes in the RF propagation conditions. To do this, both the base station and the remote terminal periodically transmit predetermined training sequences. Each remote terminal currently active on a particular channel is assigned a different predetermined training sequence and is given the training sequences for all other remotes currently active on that particular channel. In one embodiment, the different training sequences are orthogonal in the sense that the inner product of any two of the training sequence waveforms is zero. Each time the training sequences are transmitted, each remote terminal calculates how much of each training sequence it has received using well known techniques, and transmits this information to the base station.

In the illustrative embodiment, the base station uses the receiver outputs and knowledge of the transmitted waveforms to calculate the remote terminal receive spatial signatures. In another embodiment, the base station calculates how much of each remotely transmitted training sequence has come through on each output of the spatial demultiplexer, expressed as a complex vector of coupling coefficients. Knowledge of these coupling coefficients allows the currently active receive and transmit spatial signatures to be corrected so as to reduce mutual interference using well know techniques.

Finally, in systems that use time division duplexing (TDD) for full-duplex communications, as is well known in the art, the transmit and receive frequencies are the same. In this case, using the well known principle of reciprocity, the transmit and receive spatial signatures are directly related. Thus, this embodiment determines only one of the signatures, for example the receive spatial signature, and the other, in this case the transmit spatial signature, is calculated from the first (receive) spatial signature and knowledge of the relative phase and amplitude characteristics of multichannel receivers 15 and multichannel transmitters 14.

Network Level Spatial Processing

Figure 9:
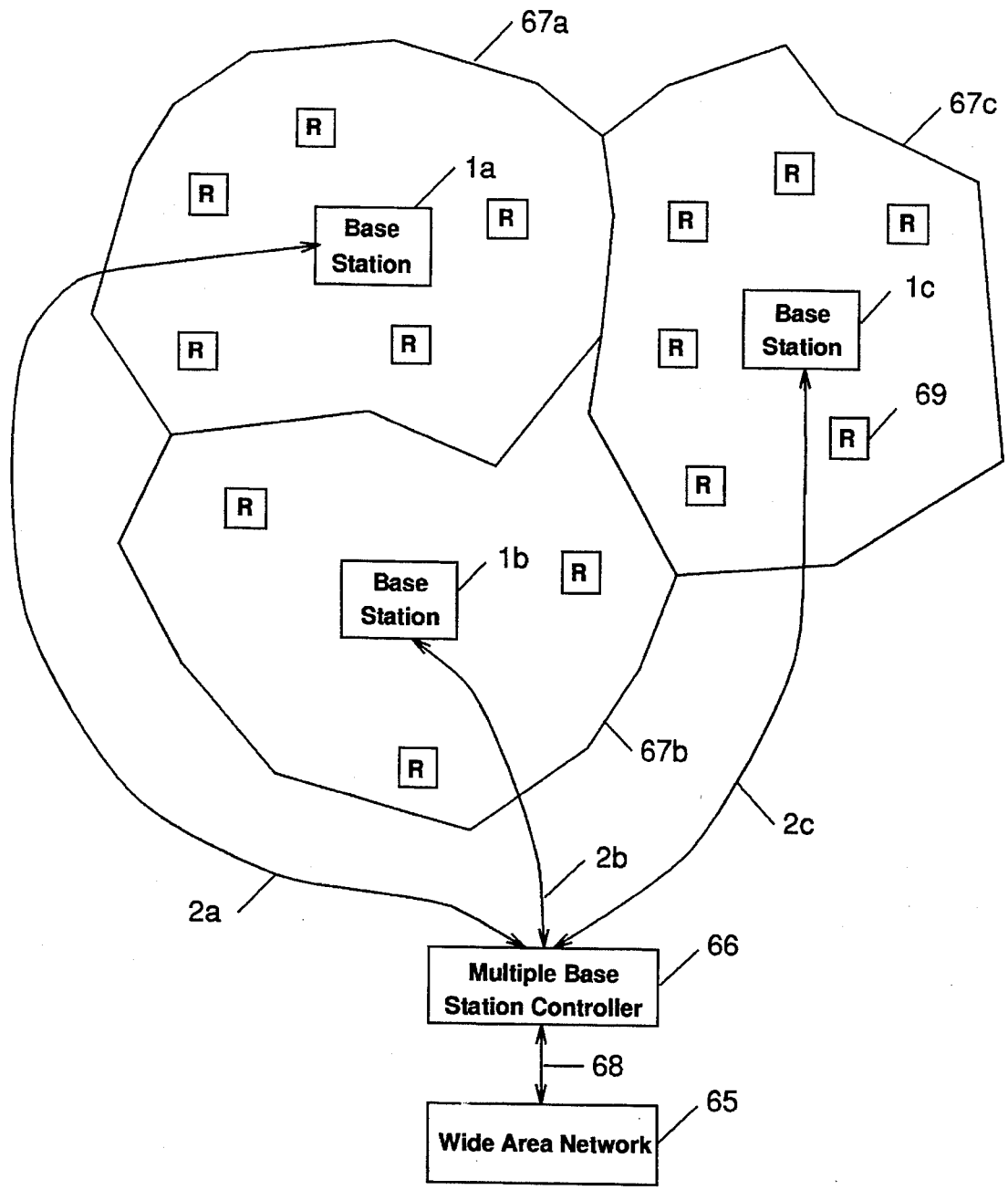
FIG. 9 is a schematic diagram of a network system comprised of three base stations and a multiple base station controller.

In the embodiment illustrated herein, the spatial processor for each base station in the cellular-like wireless communication system operates independently to maximize the number of communication channels in the immediate cell. However, significant system capacity improvements can be realized if the spatial processor from each base station communicates with and coordinates its efforts with the spatial processors from other nearby cells. A specific embodiment is shown in FIG. 9.

A multiple base station controller 66 acts as the interface between the wide area network 65 through link 68 and base stations 1 (a,b,c) via base station communication links 2 (a,b,c). Each base station is responsible for providing coverage to a number of remote terminals. In one embodiment, each remote terminal is assigned to only one base station thus defining cell boundaries 67 (a,b,c) within which all remotes attached to a particular base station are located. Users equipped with remote terminals 69 are identified by a boxed "R" in the figure.

Each spatial processor contained in base stations 1 (a,b,c) measures and stores the spatial signatures of the remote terminals in its cell and also of the remote terminals in adjacent cells. The determination of spatial signatures of the remote terminals in adjacent cells is coordinated by multiple base station controller 66 through base station communication links 2 (a,b,c). Through base station communication links 2 (a,b,c) and multiple base station controller 66, spatial processors in base stations 1 (a,b,c) from adjacent cells inform each other of which remote terminals they are communicating with on which conventional channels. Each spatial processor includes the spatial signatures of remote terminals that are currently active in adjacent cells to form extended transmit and receive spatial signature matrices $A_{rb}$ and $A_{br}$ which are sent to all the adjacent base stations. The channel selectors in each base station, using these extended spatial signature matrices, jointly assign remote terminals to each conventional channel in each of base stations 1 (a,b,c).

The resultant weight matrices $W_{tx}$ and $W_{rx}$ for each base station are then calculated using extended spatial signature matrices $A_{rb}$ and $A_{br}$. In calculating the weights, the objective is to minimize the signal transmitted to and received from the adjacent cell's active remote terminals, thereby allowing many more remote terminals to simultaneously communicate.

In an alternate embodiment, multiple base station controller 66 assigns remote terminals requesting access to base stations dynamically using a list of active remote terminal/base station/conventional channel links, the associated remote terminal databases, and the particular requirements for the link to be assigned. Additionally, remote terminals can employ multiple (directional) transmit and receive antennas, to facilitate directive links to multiple nearby base stations as instructed by multiple base station controller 66 to further increase system capacity.

Advantages

The apparatus and method in accordance with the invention provides a significant advantage over the prior art in that it allows many remote terminals to simultaneously share the same conventional communication channel. In particular, for a system with m receive and m transmit antenna elements, up to m remote terminals can share a single conventional communication channel. Moreover, signals received from and transmitted to the remote terminals have substantially improved signal-to-noise, reduced interference, and improved quality in multipath environments compared to a standard base station.

Thus, a wireless communication system can support many times more conversations, or have a much greater data throughput, with the same amount of spectrum. Alternatively, a wireless communication system can support the same number of conversations or data throughput with much less spectrum.

Alternate Embodiments

In one alternate embodiment, transmission antennas 18(a, ..., m) and reception antennas 19(a, ..., m) at base station 1 are replaced by a single array of m antennas. Each element in this array is attached to both its respective component of multichannel transmitters 14 and its respective component of multichannel receivers 15 by means of a duplexer.

In another alternate embodiment, signals on the uplink control channel may be processed in real time using the spatial processing described in copending patent application Ser. No. 07/806,695. This would allow multiple remote terminals to request a communication channel at the same time.

In yet another embodiment for applications involving data transfer of short bursts or packets of data, no separate uplink control channel is required and the system may service requests for communication and other control functions during control time intervals that are interspersed with communications intervals.

As stated above, many techniques are known for measuring the spatial signatures of the remote terminal radios and using these spatial signatures to calculate multiplexing and demultiplexing weights that will allow multiple simultaneous conversations and/or data transfers on the same conventional communication channel.

While the above description contains many specificities, these should not be construed as limitations on the scope of the invention, but rather as an exemplification of one preferred embodiment thereof. Many other variations are possible. Accordingly, the scope of the invention should be determined not by the illustrated embodiments, but by the appended claims and their legal equivalents.

What is claimed is:

1. A wireless system for calculating uplink signals transmitted from a plurality of remote terminals using a common uplink channel, said system including at least one base station, said system comprising:

receiving means at said at least one base station including a plurality of antenna elements and receivers for producing measurements of combinations of said uplink signals from said plurality of remote terminals using said common uplink channel, receive spatial processing means for determining and storing receive spatial signatures for said plurality of remote terminals using said measurements, and spatial demultiplexing means using said receive spatial signatures and said measurements to calculate said uplink signals.

2. The wireless system as defined by claim 1 wherein said receive spatial processing means comprises:

a spatial signature list comprising a receive spatial signature for each remote terminal in said plurality of remote terminals and said common uplink channel, receive spatial signature determining means for determining said receive spatial signatures, and a receive channel selector utilizing said receive spatial signatures to determine whether said common uplink channel can be further shared by an additional remote terminal.

3. The wireless system as defined by claim 2 wherein said receive spatial processing means further comprises:

a receive spatial weight processor for calculating spatial demultiplexing weights for said plurality of remote terminals, said spatial demultiplexing weights being utilized by said spatial demultiplexing means to calculate said uplink signals.

4. The wireless system as defined by claim 3 wherein said receive spatial weight processor determines said spatial demultiplexing weights as the columns of matrix $W_{rx}$ as follows:

$$W_{rx} = (A_{br} P_r A^*_{br} + R_{nn})^{-1} A_{br} P_r$$

where $()^*$ denotes the complex conjugate transpose of a matrix, $R_{nn}$ is the noise covariance matrix of said receiving means, $P_r$ is the diagonal matrix of transmit powers of the remote terminals in said plurality of remote terminals, and $A_{br}$ is a demultiplexing spatial signature matrix whose columns are said receive spatial signatures for said plurality of remote terminals and said common uplink channel.

5. The wireless system as defined by claim 1 wherein said common uplink channel is one of a plurality of uplink channels and wherein said receive spatial processing means comprises:

an active remote terminal list comprising a list of remote terminals assigned to at least one channel of said plurality of uplink channels, a spatial signature list comprising a receive spatial signature for each remote terminal of said plurality of remote terminals and each channel of said plurality of uplink channels, receive spatial signature determining means for determining said receive spatial signatures in said spatial signature list, a receive channel selector using said active remote terminal list and said spatial signature list to determine assignments of each remote terminal in said active remote terminal list to at least one of the channels of said plurality of uplink channels, and a receive spatial weight processor for calculating spatial demultiplexing weights for each of the terminals in said active remote terminal list and each channel of said plurality of uplink channels assigned to at least one of the terminals in said active remote terminal list, said spatial demultiplexing weights being utilized by said spatial demultiplexing means to calculate said uplink signals.

6. The wireless system as defined by claim 1 wherein said common uplink channel is one of a plurality of uplink channels, said at least one base station is one of a plurality of base stations, said receive spatial processing means is one of a plurality of receive spatial processing means, each base station in said plurality of base stations having a corresponding receive spatial processing means in said plurality of receive spatial processing means, each receive spatial processing means in said plurality of receive spatial processing means comprising:

an active remote terminal list comprising a list of remote terminals assigned to at least one channel of said plurality of uplink channels, a spatial signature list comprising a receive spatial signature for each remote terminal of said plurality of remote terminals and each channel of said plurality of uplink channels, receive spatial signature determining means for determining said receive spatial signatures in said spatial signature list, and a receive spatial weight processor for calculating spatial demultiplexing weights for each of the terminals in said active remote terminal list and each channel of said plurality of uplink channels assigned to at least one of the terminals in said active remote terminal list, said spatial demultiplexing weights being utilized by said spatial demultiplexing means to calculate said uplink signals, said system further comprising:

joint channel selector means for jointly determining assignments of each remote terminal in each said active remote terminal list to at least one of the channels of said plurality of uplink channels and to at least one of base stations of said plurality of base stations, and communication means for communicating the status of said assignments between each base-station in said plurality of base stations and said joint channel selector means.

7. The wireless system as defined by claim 1 and including transmission means comprising a transmitter and an antenna for sending downlink signals from said at least one base station to the terminals in said plurality of remote terminals.

8. The wireless system as defined by claim 1 wherein said spatial demultiplexing means calculates spatial demultiplexing weights for said common uplink channel as the columns of a matrix $W_{rx}$ as follows:

$$W_{rx} = (A_{br} P_r A^*_{br} + R_{nn})^{-1} A_{br} P_r$$

where $()^*$ denotes the complex conjugate transpose of a matrix, $R_{nn}$ is the noise covariance matrix of said receiver means, $P_r$ is the diagonal matrix of transmit powers of the remote terminals in said plurality of remote terminals, and $A_{br}$ is a demultiplexing spatial signature matrix whose columns are said receive spatial signatures for said plurality of remote terminals and said common uplink channel, said spatial demultiplexing means using said spatial demultiplexing weights to calculate said uplink signals.

9. The wireless system as defined by claim 1 wherein said system includes a transponder co-located with each remote terminal of said plurality of remote terminals and wherein receive spatial processing means determines said receive spatial signatures using signals transponded from at least one of the transponders.

10. The wireless system as defined by claim 1 wherein each remote terminal of said plurality of remote terminals includes a transponder and said receive spatial processing means determines said receive spatial signatures using signals transponded from at least one of the transponders.

11. The wireless system as defined by claim 1 wherein said receive spatial processing means determines said receive spatial signatures using the known location and directivity of said antenna elements, and estimates of the directions of arrival of said uplink signals from said plurality of remote terminals.

12. The wireless system as defined by claim 1 wherein said receive spatial processing means determines said receive spatial signatures using the known location and directivity of said antenna elements and the known location of said plurality of remote terminals.

13. The wireless system as defined by claim 1 wherein said uplink signals have predetermined modulation format parameters, and said receive spatial processing means determines said receive spatial signatures using said predetermined modulation format parameters of said uplink signals from said plurality of remote terminals.

14. The wireless system as defined by claim 1 further comprising:

transmission means including a plurality of transmit antenna elements and transmitters for transmitting multiplexed downlink signals to said plurality of remote terminals using a common downlink channel, transmit spatial processing means for determining and storing transmit spatial signatures for said plurality of remote terminals, and spatial multiplexing means using said transmit spatial signatures and downlink signals to produce said multiplexed downlink signals.

15. The wireless system as defined by claim 14 wherein said receiving means and said transmission means share common antenna elements using duplexers.

16. The wireless system as defined by claim 14 wherein said receiving means and said transmission means share common antenna elements using transmit/receive switches.

17. The wireless system as defined by claim 14 wherein said common uplink channel is one of a plurality of uplink channels, said common downlink channel is one of a plurality of downlink channels, and wherein said receive spatial processing means and said transmit spatial processing means comprise:

an active remote terminal list comprising a list of remote terminals assigned to at least one of the channels of said plurality of uplink channels and remote terminals assigned to at least one of the channels of said plurality of downlink channels, a spatial signature list comprising a receive spatial signature for each remote terminal of said plurality of remote terminals and each channel of said plurality of uplink channels, and a transmit spatial signature for each remote terminal of said plurality of remote terminals and each channel of said plurality of downlink channels, receive spatial signature determining means for determining said receive spatial signatures, transmit spatial signature determining means for determining said transmit spatial signatures, and a channel selector using said active remote terminal list and said spatial signature list to determine assignments of each remote terminal in said active remote terminal list to at least one of the channels of said plurality of uplink channels and at least one of the channels of said plurality of downlink channels.

18. The wireless system as defined by claim 17 wherein said receive spatial processing means and said transmit spatial processing means further comprise:

a receive spatial weight processor for calculating spatial demultiplexing weights for each of the terminals in said active remote terminals list to which a uplink channel is assigned and for each channel of said plurality of uplink channels assigned to at least one of the terminals in said active remote terminal list, said spatial demultiplexing weights being utilized by said spatial demultiplexing means to calculate said uplink signals, and a transmit spatial weight processor for calculating spatial multiplexing weights for each of the terminals in said active remote terminal list to which a downlink channel is assigned and each channel of said plurality of downlink channels assigned to at least one of the terminals in said active remote terminal list, said spatial multiplexing weights being utilized by said spatial multiplexing means to produce said multiplexed downlink signals.

19. The wireless system as defined by claim 14 wherein said at least one base station is one of a plurality of base stations, said common uplink channel is one of a plurality of uplink channels, said common downlink channel is one of a plurality of downlink channels, said receive spatial processing means is one of a plurality of receive spatial processing means, said transmit spatial processing means is one of a plurality of transmit spatial processing means, each base station in said plurality of base stations having a corresponding receive spatial processing means in said plurality of receive spatial processing means and a corresponding transmit spatial processing means in said plurality of transmit spatial processing means, each receive spatial processing means in said plurality of receive spatial processing means and each transmit spatial processing means in said plurality of transmit spatial processing means comprising:

an active remote terminal list comprising a list of remote terminals assigned to at least one of the channels of said plurality of uplink channels and remote terminals assigned to at least one of the channels of said plurality of downlink channels, a spatial signature list comprising a receive spatial signature for each remote terminal of said plurality of remote terminals and each channel of said plurality of uplink channels, and a transmit spatial signature for each remote terminal of said plurality of remote terminals and each channel of said plurality of downlink channels, receive spatial signature determining means for determining said receive spatial signatures, transmit spatial signature determining means for determining said transmit spatial signatures, a receive spatial weight processor for calculating spatial demultiplexing weights for each of the terminals in said active remote terminal list to which a uplink channel is assigned and each channel of said plurality of uplink channels assigned to at least one of the terminals in said active remote terminal list, said spatial demultiplexing weights being utilized by said spatial demultiplexing means to calculate said uplink signals, and a transmit spatial weight processor for calculating spatial multiplexing weights for each of the terminals in said active remote terminal list to which a downlink channel is assigned and each channel of said plurality of downlink channels assigned to at least one of the terminals in said active remote terminal list, said spatial multiplexing weights being utilized by said spatial multiplexing means to produce said multiplexed downlink signals, said system further comprising:
joint channel selector means for jointly determining assignments of each remote terminal in each said active remote terminal list to at least one of the channels of said plurality of uplink channels, to at least one of the channels of said plurality of downlink channels and to at least one of the base stations of said plurality of base stations, and communication means for communicating said assignments between each base station in said plurality of base stations and said joint channel selector means.

20. The wireless system as defined by claim 14 wherein said spatial multiplexing means determines spatial multiplexing weights for said common downlink channel as the rows of a matrix $W_{tx}$ as follows:

$$W_{tx} = S_b(A_{rb}A^*_{rb})^{-1}A_{rb},$$

where $()^*$ denotes the complex conjugate transpose of a matrix, $S_b$ is the diagonal matrix of amplitudes of said downlink signals, and $A_{rb}$ is a multiplexing spatial signature matrix whose rows are said transmit spatial signatures for said plurality of remote terminals and said common downlink channel, and wherein said spatial multiplexing means utilizes said spatial multiplexing weights to produce said multiplexed downlink signals.

21. The wireless system as defined by claim 14 wherein said system includes a transponder co-located with each remote terminal of said plurality of remote terminals and wherein transmit spatial processing means determines said transmit spatial signatures using signals transponded from at least one of the transponders.

22. The wireless system as defined by claim 14 wherein each remote terminal in said plurality of remote terminals includes a transponder, and wherein said transmit spatial processing means determines said transmit spatial signatures using signals transponded from at least one of the transponders.

23. The wireless system as defined by claim 14 wherein said downlink signals have predetermined modulation format parameters, and said transmit spatial signatures are determined by the corresponding terminals in said plurality of remote terminals using the predetermined modulation format parameters of said downlink signals.

24. The wireless system as defined by claim 14 wherein said transmit spatial processing means determines said transmit spatial signatures using the known location and directivity of said transmit antenna elements and estimates of directions of arrival of said uplink signals from said plurality of remote terminals.

25. The wireless system as defined by claim 14 wherein said downlink signals and said uplink signals are transmitted on the same radio frequency and said transmit spatial processing means determines said transmit spatial signatures by calculating them directly from said receive spatial signatures.

26. The wireless system as defined by claim 14 wherein said transmit spatial processing means determines said transmit spatial signatures using the known location and directivity of said antenna elements and the known location of said plurality of remote terminals.

27. A wireless system including at least one base station for transmitting to a plurality of remote terminals using a common downlink channel, said system comprising:

transmission means at said at least one base station including a plurality of transmit antenna elements and transmitters for transmitting multiplexed downlink signals to said plurality of remote terminals, transmit spatial processing means for determining transmit spatial signatures for said plurality of remote terminals, and spatial multiplexing means using said transmit spatial signatures and downlink signals to produce said multiplexed downlink signals, whereby said at least one base station can transmit said downlink signals to said plurality of remote terminals simultaneously on a common downlink channel.

28. The wireless system as defined by claim 27 wherein said common downlink channel is one of a plurality of downlink channels and wherein said transmit spatial processing means comprises:

an active remote terminal list comprising a list of remote terminals assigned to at least one the channels of said plurality of downlink channels, a spatial signature list comprising a transmit spatial signature for each remote terminal of said plurality of remote terminals and each channel of said plurality of downlink channels, transmit spatial signature determining means for determining said transmit spatial signatures, and a transmit channel selector using said active remote terminal list and said spatial signature list to determine assignments of each remote terminal in said active remote terminal list to at least one of the channels of said plurality of downlink channels.

29. The wireless system as defined by claim 28 wherein said transmit spatial processing means further comprises:

a transmit spatial weight processor for calculating spatial multiplexing weights for each of the terminals in said active remote terminal list to which a downlink channel is assigned and each channel of said plurality of downlink channels assigned to at least one of the terminals in said active remote terminal list, said spatial multiplexing weights being utilized by said spatial multiplexing means to produce said multiplexed downlink signals.

30. The wireless system as defined by claim 27 wherein said at least one base station is one of a plurality of base stations, said common downlink channel is one of a plurality of downlink channels, said transmit spatial processing means is one 5 of a plurality of transmit spatial processing means, each base station in said plurality of base stations having a corresponding transmit spatial processing means in said plurality of transmit spatial processing means, each transmit spatial processing means in said plurality of transmit spatial processing means comprising:

an active remote terminal list comprising a list of remote terminals assigned to at least one the channels of said plurality of downlink channels, a spatial signature list comprising a transmit spatial signature for each remote terminal of said plurality of remote terminals and each channel of said plurality of downlink channels, transmit spatial signature determining means for determining said transmit spatial signatures, and a transmit spatial weight processor for calculating spatial multiplexing weights for each of the terminals in said active remote terminal list to which a downlink channel is assigned and each channel of said plurality of downlink channels assigned to at least one of the terminals in said active remote terminal list, said spatial multiplexing weights being utilized by said spatial multiplexing means to produce said multiplexed downlink signals, said system further comprising:
- joint channel selector means for jointly determining assignments of each remote terminal in each said active remote terminal list to at least one of the channels of said plurality of down channels and to at least one of the base stations of said plurality of base stations, and
- communication means for communicating said assignments between each base station in said plurality of base stations and said joint channel selector means.

31. The wireless system as defined by claim 27 wherein said spatial multiplexing means determines spatial multiplexing weights for said common downlink channel as the rows of a matrix $W_{tx}$ as follows:

$$W_{tx} = S_b (A_{rb} A^*_{rb})^{-1} A_{rb}$$

where $()^*$ denotes the complex conjugate transpose of a matrix, $S_b$ is the diagonal matrix of amplitudes of said downlink signals, and $A_{rb}$ is a multiplexing spatial signature matrix whose rows are said transmit spatial signatures for said plurality of remote terminals and said common downlink channel, and said spatial multiplexing means utilizes said spatial multiplexing weights to produce said multiplexed downlink signals.

32. The wireless system as defined by claim 27 wherein said system includes a transponder co-located with each remote terminal of said plurality of remote terminals and wherein said transmit spatial processing means determines said transmit spatial signatures using signals transponded from at least one of the transponders.

33. The wireless system as defined by claim 27 wherein each remote terminal in said plurality of remote terminals includes a transponder, and wherein said transmit spatial processing means determines said transmit spatial signatures using signals transponded from at least one of the transponders.

34. The wireless system as defined by claim 27 wherein said downlink signals have predetermined modulation format parameters, and said transmit spatial signatures are determined by the corresponding terminals in said plurality of remote terminals using the predetermined modulation format parameters of said downlink signals.

35. The wireless system as defined by claim 27 wherein said transmit spatial processing means determines said transmit spatial signatures using the known location and directivity of said antenna elements and the known location of said plurality of remote terminals.

* * * * *